United States Patent
De et al.

(10) Patent No.: US 7,872,977 B2
(45) Date of Patent: Jan. 18, 2011

(54) MULTI-CRITERIA OPTIMIZATION FOR RELAYING IN MULTI-HOP WIRELESS AD HOC AND SENSOR NETWORKS

(75) Inventors: Swades De, New Delhi (IN); Komlan Egoh, Springfield Gardens, NY (US)

(73) Assignee: New Jersey Institute of Technology, Newark, NJ (US)

( * ) Notice: Subject to any disclaimer, the term of this patent is extended or adjusted under 35 U.S.C. 154(b) by 178 days.

(21) Appl. No.: 12/132,860

(22) Filed: Jun. 4, 2008

(65) Prior Publication Data

US 2009/0016224 A1    Jan. 15, 2009

Related U.S. Application Data

(60) Provisional application No. 60/941,754, filed on Jun. 4, 2007.

(51) Int. Cl.
    *H04L 12/26* (2006.01)
(52) U.S. Cl. .................................................... 370/238
(58) Field of Classification Search .................. 370/238
    See application file for complete search history.

(56) References Cited

U.S. PATENT DOCUMENTS 5,295,154 A * 3/1994 Meier et al. .................. 370/351
6,653,932 B1 * 11/2003 Beamish et al. ............. 455/3.01
2008/0188177 A1 * 8/2008 Tan et al. ..................... 455/11.1

OTHER PUBLICATIONS

Karim Seada et al., Energy-Efficient forwarding Strategies for Geographic Routing in Lossy wireless Sensor Networks, (ACM SENSYS, Baltimore, MD, Nov. 2004, pp. 108-121).*
International Search Report and Written Opinion for PCT/US2008/065790 mailed Aug. 29, 2008.
B. Karp and H. T. Kung, "GPSR: Greedy perimeter stateless routing for wireless networks," in Proc. ACM MOBICOM, Boston, MA, Aug. 2000, pp. 243-254.
M. Zorzi and R.R. Rao, "Geographic random forwarding (GeRaF) for ad hoc and sensor networks: Multihop performance" IEEE Trans. Mobile Comput., vol. 2, No. 4, pp. 337-348, Oct.-Dec. 2003.
S. De, "On hop count and Euclidean distance in greedy forwarding in wireless ad hoc networks" IEEE Commun. Letters, vol. 9, No. 11, pp. 1000-1002, Nov. 2005.
K. Seada, M. Zuniga, A. Helmy, and B. Krishnamachari, "Energy efficient forwarding strategies for geographic routing in lossy wireless sensor networks" in Proc. ACM SENSYS, Baltimore, MD, Nov. 2004, pp. 108-121.

(Continued)

*Primary Examiner*—Derrick W Ferris
*Assistant Examiner*—Mang Yeung (57) ABSTRACT

A generalized multi-parameter mapping function aggregates decision criteria into a single virtual criterion to rank the potential relay candidates. Optimal rules for next hop relay as applicable to both transmitter-side selection and receiver-side election based forwarding schemes are also provided. Examples of network performance based on two optimization criteria include one-hop progress (greediness) and packet success rate (link quality). A suitable mapping function trades off the greediness for link quality. Simulation information is provided that indicates that the implementation according to the mapping function outperforms the reported transmitter-side link-aware forwarding schemes.

18 Claims, 11 Drawing Sheets

OTHER PUBLICATIONS

S. Lee, B. Bhattacharjee, and S. Banerjee, "Efficient geographic routing in multihop wireless networks" in Proc. ACM MobiHoc, Urbana-Champaign, IL, May 2005, pp. 230-241.

M.R. Souryal and N. Moayeri, "Channel-adaptive relaying in mobile ad hoc networks with fading" in Proc. IEEE SECON Santa Clara, CA, Sep. 2005. pp. 142-152.

H. Fubler, J. Widmer, and M. Kasemann, "Contention based forwarding for mobile ad hoc networks" Elsevier Ad Hoc Networks, vol. 1, No. 4, pp. 351-369, Nov. 2003.

K. Egoh and S. De, "Priority-based receiver-side relay election in wireless ad hoc sensor networks" in Proc. IEEE IWCMC'06, pp. 1177-1182, Vancouver, British Columbia, Canada, Jul. 2006.

H. Takagi and L. Kleinrock, "Optimal transmission ranges for randomly distributed packet radio terminals" IEEE Trans. Commun., vol. COM-32, No. 3, pp. 246-257, Mar. 1984.

M. Mauve, J. Widmer, and H. Hartenstein, A survey on position based routing in mobile ad hoc sensor networks, IEEE Network Mag., vol. 15, pp. 30-39, Nov./Dec. 2001.

T. C. Hou and V. O. K. Li, "Transmission range control in multihop packet radio networks" IEEE Trans. Commun., vol. 34, No. 1, pp. 38-44, Jan. 1986.

A. Rao, C. Papadimitrou, S. Ratnasamy, S. Shenker and I. Stoica, "Geographic routing without location information" in Proc. ACM MOBICOM, San Diego, CA, Sep. 2003, pp. 96-108.

Egoh K. et al. Department of Electr. & Comput. Eng., New Jersey Inst. Of Technol., Newark, NJ: "A Multi-criteria Receiver-side Relay Election Approach in Wireless Ad Hoc Networks" MILCOM 2006 [Online] Oct. 23, 2006, -Oct. 25, 2006 XP002492255 US ISBN: 1-4244-0618-8 IEEE Xplore Retrieved from the Internet: URL: http://ieeexplore.ieee.org/xpls/abs_all.isp?arnumber=4086624> [retrieved on Aug. 14, 2008] the whole document.

International Preliminary Report on Patentability for PCT/US2008/065790 mailed Dec. 17, 2009.

Communication from the European Patent of Office for EP Application 08770115.7, mailed Jun. 30, 2010.

\* cited by examiner

MULTI-CRITERIA OPTIMIZATION FOR RELAYING IN MULTI-HOP WIRELESS AD HOC AND SENSOR NETWORKS

CROSS REFERENCE TO RELATED APPLICATIONS

The present application claims priority to U.S. Provisional Application No. 60/941,754 entitled "Multi-Criteria Optimization for Relaying in Multihop Wireless Ad Hoc and Sensor Networks" filed on Jun. 4, 2007, and incorporated herein by reference.

STATEMENT OF FEDERALLY FUNDED RESEARCH

The present application includes research supported in part by the National Science Foundation (NSF) under Grant No. 0435250. The federal government may have certain rights in the present application.

BACKGROUND

The present disclosure relates to multi-hop wireless communication. More specifically, the present disclosure relates to receive-side-relay-election (RSRE) which does not require that a transmitting node select the next hop relay node.

Conventionally, ad hoc and sensor network multi-hop relaying decisions are made at the transmitter end, and individual criterion such as a geographic distance based greediness approach has typically received the primary attention (see, e.g., H. Takagi and L. Kleinrock, "Optimal transmission ranges for randomly distributed packet radio terminals," IEEE Trans. Commun., vol. COM-32, no. 3, pp. 246-257, March 1984; and B. Karp and H. T. Kung, "GPSR: Greedy perimeter stateless routing for wireless networks," in Proc. ACM MOBICOM, Boston, Mass., August 2000, pp. 243-254, each of which are incorporated by reference herein). A receiver side relay election approach was suggested in M. Zorzi and R. R. Rao, "Geographic random forwarding (GeRaF) for ad hoc and sensor networks: Multihop performance," IEEE Trans. Mobile Comput., vol. 2, no. 4, pp. 337-348, Oct.-Dec. 2003 and H. Fubler, J. Widmer, and M. Kasemann, "Contention-based forwarding for mobile ad hoc networks," Elsevier Ad Hoc Networks, vol.1, no.4, pp.351-369, November 2003, each of which are incorporated by reference herein in its respective entirety, where geographic distance was considered the only criterion for an optimum relay node. However, these works do not give any useful direction for practical implementation.

Recently, K. Seada, M. Zuniga, A. Helmy, and B. Krishnamachari, "Energy efficient forwarding strategies for geographic routing in lossy wireless sensor networks," in Proc. ACM SENSYS, Baltimore, Md, November 2004, pp. 108-121; S. Lee, B. Bhattacharjee, and S. Banerjee, "Efficient geographic routing in multihop wireless networks," in Proc. ACM MobiHoc, Urbana-Champaign, IL, May 2005, pp. 230-241; and M. R. Souryal and N. Moayeri, "Channel-adaptive relaying in mobile ad hoc networks with fading" in Proc. IEEE SECON Santa Clara, Calif., September 2005, each of which is incorporated by reference herein, considered link quality as a criterion in addition to geographic distance for relay node selection/election. However, firstly, these works simply considered the product form of forward progress and packet error rate offered by a relay candidate and do not delve into whether this product form offers the best performance. Secondly, the focus of these works is not on capturing the additional contention that results from the multi-criteria election process.

SUMMARY

A first part of this application provides a guideline for an optimum relay election approach based on any single criterion forwarding. In traditional multi-hop wireless communications, at each hop, the transmitting nodes choose the next hop relay amount to a set of neighbor nodes. This conventional approach, however, has high overhead in highly populated and more dynamic wireless ad hoc and sensor networks. An alternative approach, referred to hereinafter as receive-side-relay-election (RSRE), does not require that a transmitting node select the next hop relay node. Rather, an election is held among potential relay candidates, and the best candidate is elected based on a given criterion.

In this patent application, it is shown mathematically and through network simulation how RSRE performance can be optimized when considering a single decentralized relaying decision criterion, e.g., remaining geographic distance at each hop to the destination. An exemplary mapping function is also introduced to associate relative priority among potential relay candidates, and to show that an optimal mapping coefficient can be obtained that elects the best candidate with minimal election delay and collision vulnerability. This single-criterion mapping function is general and can be tailored to any other individual relaying criterion, such as remaining nodal energy and/or instantaneous spatial distribution of network congestion.

A multi-criteria optimization model for RSRE based multi-hop forwarding is provided which may be applied to a well-known problem associated with wireless greedy forwarding. Wireless greedy forwarding tends to select a neighbor at each hop with the least remaining distance to the final destination. Unfortunately, the link to the most forward node is also likely the most error prone, and, consequently, likely to cause more packet loss and retransmissions. This problem can be solved by taking a multi-criteria decision making approach that includes both forward progress and link quality of each relay candidate. A generalized mapping function according to described embodiments maps multiple optimization criteria into a single criterion. An optimal tradeoff between greediness and link quality can be obtained with systems described herein. Compared with previously reported forwarding approaches based on simple product form of greedy progress and packet error rate, the results disclosed herein show that by judiciously weighting the forward progress and link quality, significantly better energy and delay performance and up to five times improvement in end-to-end packet loss can be achieved. The proposed multi-criteria approach may be useful in optimum relaying decision making that take into account any number of nodal and network constraints.

BRIEF DESCRIPTION OF THE DRAWINGS

The objects and advantages of the present application are apparent upon consideration of the following detailed description, taken in conjunction with the accompanying drawings, in which like reference characters refer to like parts throughout, and in which.

DETAILED DESCRIPTION

Traditional purely greedy forwarding in wireless ad hoc networks is not optimal in most practical settings where perfect-reception-within-range cannot be assumed. Although a few link-aware routing schemes have been reported, tradeoffs between greediness and link quality have not been studied. In this patent application, an approach including a multi-criteria based receiver-side relay election in wireless multi-hop forwarding has been provided, where, preferably, a single optimal node is elected among many candidates to relay packets toward the final destination. A general cost metric is also introduced in the form of a multi-parameter mapping function that aggregates all decision criteria into a single virtual criterion to rank potential relay candidates. It is also shown that a suitable mapping function can be found which trades off greediness for link quality to obtain optimal end-to-end network performance. Compared with the previously reported link-aware forwarding schemes, simulation results set forth herein show a better energy performance and a substantial improvement in end-to-end delay.

Various distributed forwarding schemes have been proposed for multi-hop wireless networks, where a transmitting node selects one of its neighbors to relay data packets toward the destination. In these schemes, a simple criterion, such as the relaying neighbor's geographical proximity to the final destination or the energy required to transmit a packet, is used by a transmitting node to select the best possible relay. Such forwarding approaches require that a list of all local neighbors be maintained at each node.

However, maintaining local neighborhood information at all nodes in a dense network with a dynamic network environment and making sure the selected relaying node is active (e.g., by wake up signals or coordinated sleep patterns) may be costly for the resource constrained nodes. Moreover, a vast majority of the proposed rules for selecting the next forwarding neighbor assume unit disk coverage wherein a node within the coverage range is considered perfectly reachable. Furthermore, the aforementioned rules preferably use only a single metric (e.g., one-hop progress, remaining energy) to choose the best candidate. However, in reality, the unit disk assumption does not hold from a physical layer perspective.

Figure 1:
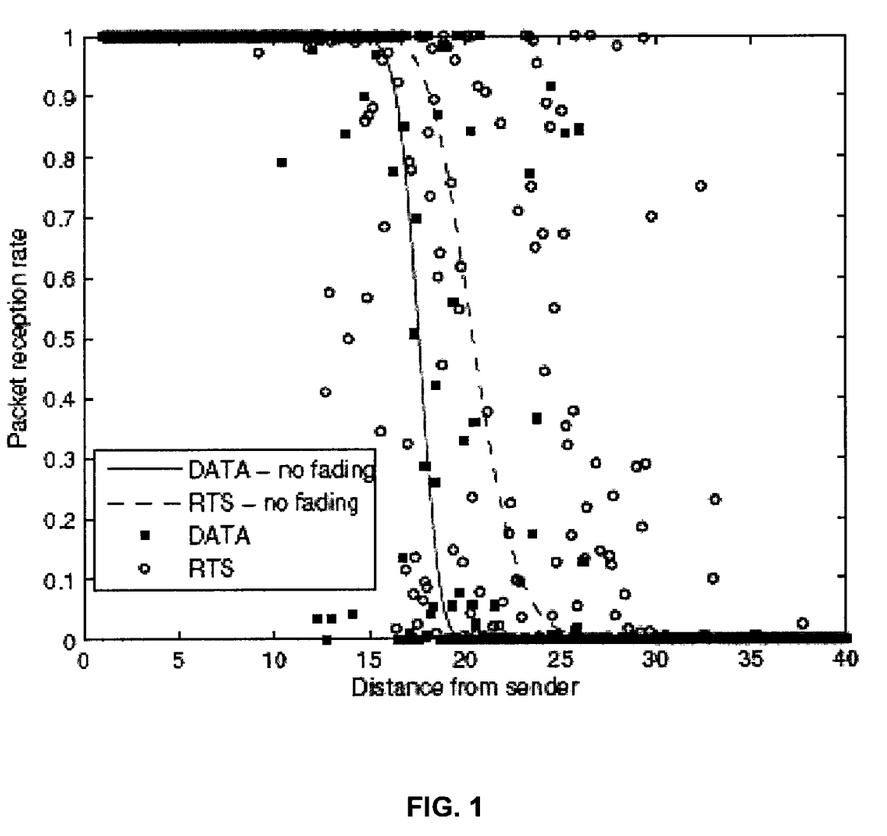
FIG. 1 is a chart illustrating a sample of reachability in realistic wireless settings.

FIG. 1 shows a chart illustrating a sample of reachability in realistic wireless settings. A single criterion based forwarding node selection may not achieve the goal of network-wide optimal performance. As an example, the hop-count based greedy geographic forwarding approach has received a great deal of attention in the ad hoc networking research community. In this approach, a transmitter tends to select a node with poor link quality. For this reason, there have been a growing acceptance that the traditional purely greedy forwarding approach is not optimal in most practical settings where the unit disk assumption or a perfect-reception within-range does not hold good. Although some link-aware routing schemes have been reported recently, the tradeoffs between greediness and link quality have not been thoroughly studied.

The challenge in considering more than one criterion (such as link quality, delay, remaining energy) for the next hop selection lies in deciding the optimality of a particular neighbor with respect to other nodes, because different criteria could have possibly conflicting goals. In other words, the familiar scalar notion of optimality does not hold when multiple criteria are considered. Furthermore, although the transmitter-side relay selection has the convenience of centralized decision making, a transmitter has the additional burden of gathering and maintaining all decision information.

An alternative to transmitter-side relay selection is receiver-side relay election in which the transmitting node does not decide on the next hop relaying neighbor. Rather, all neighbors contend among themselves to elect the best possible relay. With a receiver-side relay election scheme, information on priority criteria, such as, for example, received signal strength and remaining energy, are readily available at each potential relay node. This information can be included in deciding the next hop node. However, even in a single optimality criterion based forwarding (e.g., one-hop progress), the receiver-side relay election introduces an additional challenge of vulnerability to collision because of the distributed nature of the election process.

Multi-criteria receiver-side relay election in multi-hop wireless networks involves electing one relay among many candidate relays to relay a packet toward the destination. A generalized multi-parameter mapping function preferably aggregates all decision criteria into a single virtual criterion to rank the potential relay candidates. Optimal rules are also proposed and investigated for next hop relay as applicable to both transmitter-side selection and receiver-side election based forwarding schemes. Beyond the theoretical formulation of the generalized multi-criteria based optimum election, as a demonstrative example of network performance evaluation, network performance based on two optimality criteria is considered, namely one-hop progress (greediness) and packet success rate (link quality). A suitable mapping function is provided which trades off the greediness for link quality and outperforms the reported transmitter-side link-aware forwarding schemes. Compared to the other schemes, the distributed two-criteria optimization described in the present application shows a substantially better end-to-end delay performance and a reduction of up to five times in end-to-end packet loss for the same required energy.

Rules for optimum multi-hop communication have been considered in packet radio networks. Many location-based forwarding solutions have been proposed which select as next hop the closest neighbor, or the neighbor closest to the destination. Until recently, all location-aware forwarding schemes typically proposed to make the selection of the next hop node at the transmitter-side. These schemes may work well with lightly populated and relatively static ad hoc networks. However more dynamic, dense, and resource constrained networks, such as sensor networks, have prompted reconsideration of the rules of multi-hop forwarding.

It is shown herein that the simple product form (PROD) can be outperformed by an optimum tradeoff between greediness and link quality. Additionally, a multi-criteria relaying framework can potentially accommodate any number of constraints in selecting/electing a next-hop node. As a specific example, greediness and reachability are considered herein as two criteria for optimum relay election and it is shown that by judicious selection of weightage of two different criteria, a significantly improved network performance and nodal energy saving can be achieved.

Receiver-side relay election is a decentralized process where the next relaying node is decided through contention among all potential candidates. A RTS/CTS (request-to-send/clear-to-send) message exchange is done where the RTS packet is a broadcast message containing position information of the sender and the final destination. Upon receiving this RTS packet, the potential relay candidates initiate a contention resolution process among themselves to elect the most suitable candidate as the next hop relay. The contention is typically resolved by introducing random or distance dependent time back-off. The first candidate to reply is the winner of the election process, and all other candidates abort.

For the purposes of this application, a function $g\alpha(.)$ is used that maps, for each candidate i, the single election criterion, forward progress $d_i$, onto the response time delay $X_i$.

$$X_i = g_\alpha(d_i) = a(\alpha)d_i^\alpha + b(\alpha) \quad (1)$$

where $\alpha$ is a shape parameter used to tune the performance of the election process. Here, perfect reception is assumed within a range [0,R] and the mapped time delay range is $[t_2, t_1]$. The equation above is obtained by generalization of the linear mapping function.

Figure 2:
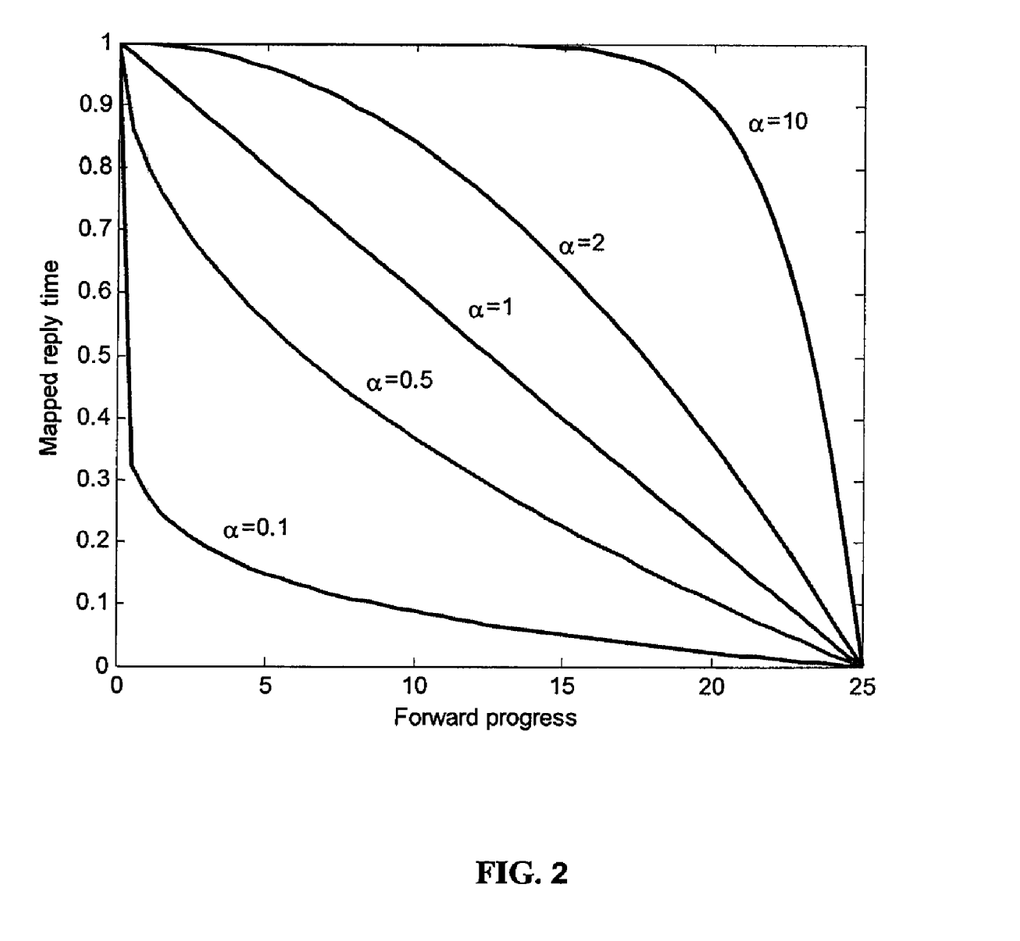
FIG. 2 is a chart illustrating parametric single-criterion mapping functions according to an embodiment.

FIG. 2 shows a chart illustrating parametric single-criterion mapping functions according to at least one embodiment. In FIG. 2, the forward progress interval [0,25] is mapped onto the time interval [0,1]. Coefficients $a(\alpha)$ and $b(\alpha)$ are obtained using the limiting conditions for the worst candidate ($g\alpha(0)=t_1$) and the best candidate ($g\alpha=t_1$), where $$a(\alpha) = \frac{t_2 - t_1}{R^\alpha}; \quad (2)$$
$$b(\alpha) = t_1$$

One performance characteristic of a receiver-side relay election is the time duration of each election round. The average time until reception of a CTS response at the transmitter depends on the probability distribution of the mapped value $X_i$ which in turn is a function of the shape parameter $\alpha$.

The cumulative distribution function $F_x$ and density function $f_x$ of the individual scheduled time $X_{iS}$ are derived from the chosen decision criterion (in this case, one-hop progress). Let $Y = \min_i\{Xi\}$ be the random variable denoting the time when the transmitter receives a CTS, in case the election process is successful. The distribution of Y is given by $$F_Y(y) = Pr[Y \leq y] = \frac{1 - e^{-nF_x(y)}}{1 - e^{-n}} \quad (3)$$
$$f_Y(y) = \frac{nf_x(y)e^{-nF_x(y)}}{1 - e^{-n}}$$

where n is the average number of active forward direction neighbors. From the above distributions the average delay of a contention process E[Y] is computed.

Another characteristic of receiver-side election is the likelihood of collision between contending potential relays. Collisions are possible among two or more candidates if their respective back-off times are very close. Put mathematically, there could be collision and possible failure of the election process if candidates i and j schedule respective response time $X_i$ and $X_j$, such that $|X_i - X_j| \leq \beta$ where the collision vulnerability window $\beta$ depends on the physical characteristics of the radio transceiver (e.g., transmit to receive switch-over time). The probability of collision can be expressed as:

$$P_f = 1 - (h \copyright S_Y)(\beta) \quad (4)$$

Where © represents the correlation integral function defined by $$(h \copyright S_Y)(t) = \int_{-\infty}^{\infty} h(x)S_Y(t+x)\,dx$$

$S_Y(y) = 1 - F_Y(y)$ is the survival function of y, and $h(y) = \frac{f_Y(y)}{S_Y(y)}$ is the corresponding failure rate.

Although the average duration of the election process E[Y] can be made arbitrarily small with a small value of $\alpha$, this also increases the probability of collision $P_f$ during the election process. Considering the effective delay of a successful election process, an optimal shape parameter can be found that minimizes the duration of election rounds while mitigating the probability of collision. The value of the optimal shape parameter a depends on the recovery or retransmission policy used in case of collision during the election process. If the election rounds can be represented by unlimited Bernoulli trials until successful relay election, the optimal $\alpha$ value can be obtained by minimizing the effective delay $D_e$, which is given by $$D_e = \frac{P_f}{1 - P_f} t_1 + E[Y] \quad (5)$$

Figure 3:
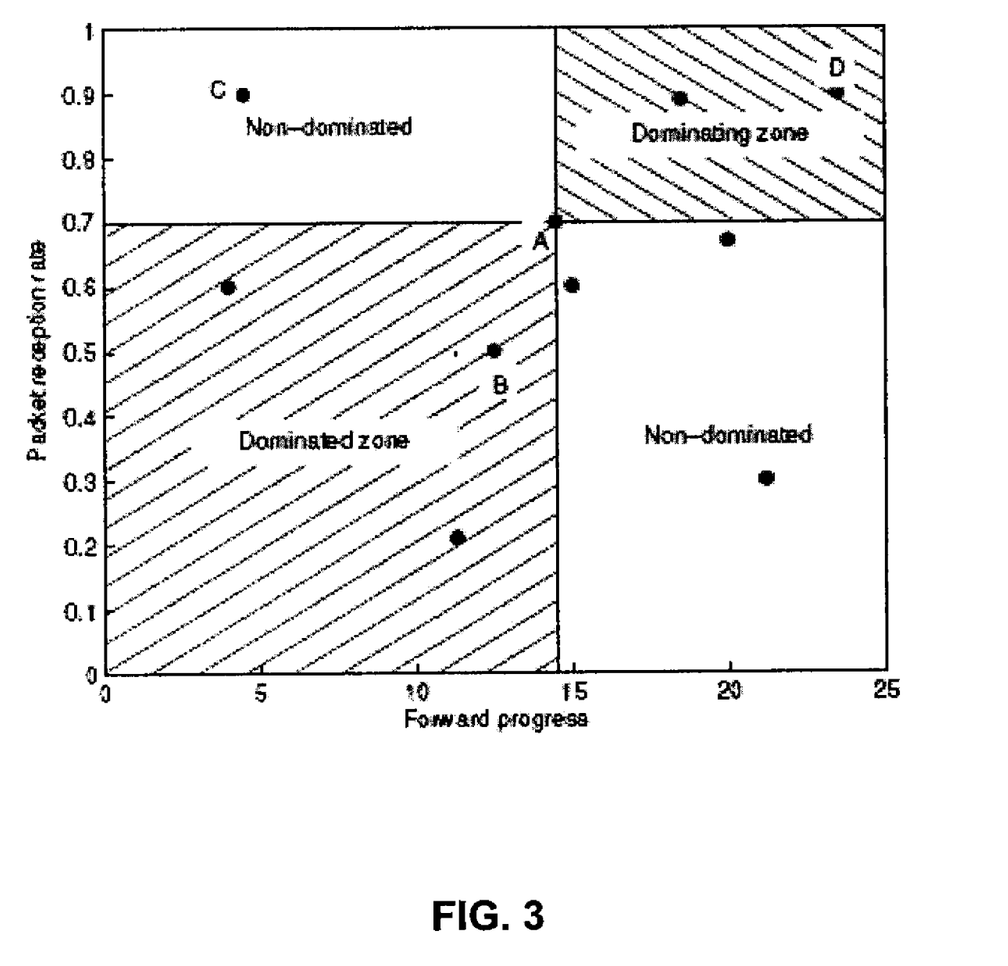
FIG. 3 is a chart illustrating the relation between a particular node (A) and other candidates according to an embodiment.

As noted earlier, multi-hop forwarding based on the one-hop progress criterion can hardly be optimal because of the unreliable nature of wireless links and other nodal limitations, such as energy, buffer capacity, etc. However, as more than one decision parameter are considered, the ranking of an alternative candidate becomes less obvious than in the single criterion case. Consider for example FIG. 3, which shows a chart illustrating the relation between a particular node (A) and other candidates, where two criteria are used to select the best relay node. In general, with respect to FIG. 3, only candidates in the hatched areas can be strictly compared with node A. With respect to a particular node (node A), the relationship with any other candidate can be classified as follows:

All nodes in the dominated zone are clearly strictly 'inferior' compared to node A because they perform strictly poorer on at least one criterion and at most as good on all others. All nodes in the dominating zone are clearly strictly 'superior' compared to node A because they perform strictly better on at least one criterion and at least as good on all others. However, nodes in the two non-dominated zones perform better than node A on a single criterion and poorer on all others. Therefore, nodes in the non-dominated zone cannot be qualified 'inferior' or 'superior' to node A. Note that a forwarding decision can be made that maximizes all decision criteria whenever there exists a single candidate that dominates all other candidates (see node D in FIG. 3). However, in general, a single dominating candidate may not exist and an additional model may be needed to define preference and tradeoffs among multiple criteria.

A general preference model in the form of an aggregating function that combines all criteria into a single virtual criterion used to out-rank all weak candidates may now be considered. Because the order induced by the dominance relationship on the set of alternative candidates is partial, there may exist among the set of alternatives, pairs of mutually incomparable candidates. With the mapping function, one objective is to introduce a single ranking scale through the use of an aggregating function that weights all criteria into a single one. Consider a decision based on k numerical criteria for which each candidate has a performance index represented by the vector $\overline{\Omega}_i = (\Omega_{i1}, \Omega_{i2}, \ldots, \Omega_{ik})$.

Figure 4:
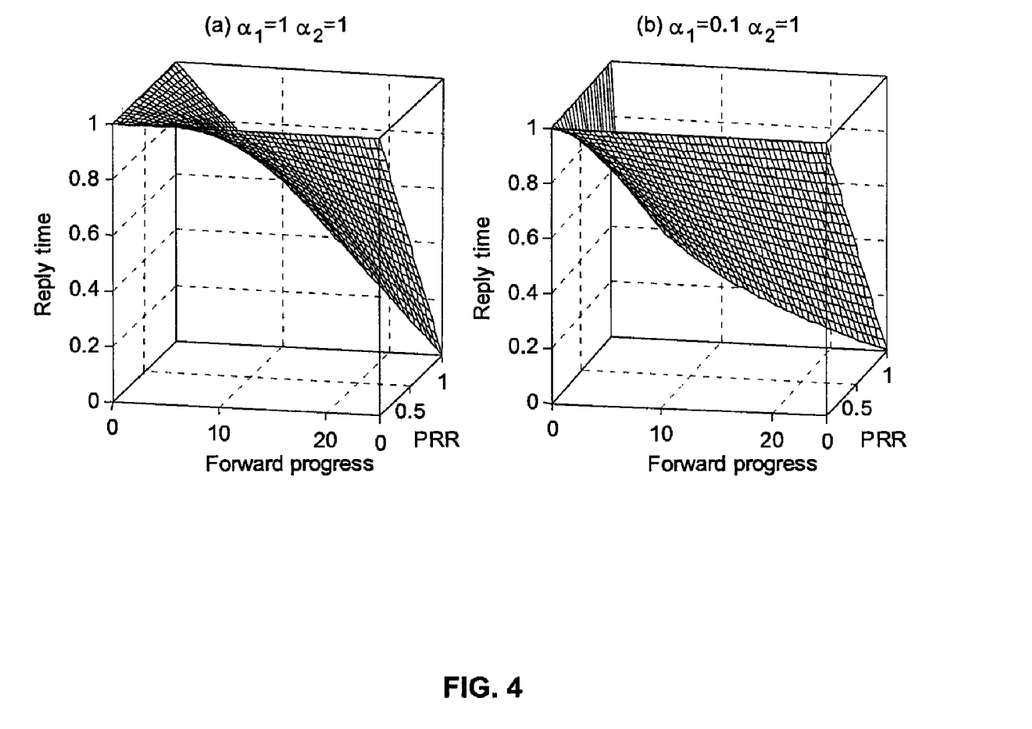
FIG. 4 is a mapping function in a two criteria case according to an embodiment.

Without loss of generality, it may be assumed that decision criterion $(\Omega_i)$ has a value in the range $[0, \Omega_{imax}]$ and should preferably be maximized. All decision variables may then be mapped onto the scheduled time by introducing the multidimensional family of the following function (see FIG. 4, which shows a mapping function in a two criteria example):

$$g_{\overline{\alpha}}(\Omega_{i1}, \Omega_{i2}, \ldots, \Omega_{ik}) = a(\overline{\alpha})\Omega_{i1}^{\alpha_1}\Omega_{i2}^{\alpha_2 1} \ldots \Omega_{ik}^{\alpha_k} + b(\overline{\alpha}) \quad (6)$$

where $\overline{\alpha} = (\alpha_1, \alpha_2, \ldots, \alpha_k)$ is k-parameter vector used to weight the k decision criteria. As in the single criterion case, the scheduled reply time for each candidate is: $X_i = g_{\overline{\alpha}}(\overline{\Omega}_i)$. From the perspective of transmitter-side relay selection, a corresponding cost metric can be derive from $g_{\overline{\alpha}}(.)$ as $$C_{\overline{\alpha}}(\overline{\Omega}_i) = \Omega_{i1}^{\alpha_1}\Omega_{i2}^{\alpha_2} \ldots \Omega_{ik}^{\alpha_k} \quad (7)$$

Ranking all candidates with respect to $g_{\overline{\alpha}}$ in (descending order) or $C_{\overline{\alpha}}$ (in ascending order), creates a total ordering system on the set of all alternative candidates. That is, for any arbitrary two candidates i and j, $C_{\overline{\alpha}}(\overline{\Omega}_i) \leq C_{\overline{\alpha}}(\overline{\Omega}_j)$ or $C_{\overline{\alpha}}(\overline{\Omega}_i) \geq C_{\overline{\alpha}}(\overline{\Omega}_j)$. Note that, for any positive real constant m>0, $C_{m\overline{\alpha}}$, m $\overline{\alpha} = (m\alpha_1, m\alpha_2, \ldots, m\alpha_k)$ produces the same ranking as $C_{\overline{\alpha}}$. Therefore, $g_{\overline{\alpha}}$ can be seen as a single virtual criterion $$\left(C_{\frac{1}{\alpha_1}\overline{\alpha}}\right)$$

which, as in single criterion case in Section III, may be mapped onto the time interval [t2,t1] for the purpose of receiver-side contention resolution:

$$g_{\overline{\alpha}}(\overline{\Omega}) = a(\overline{\alpha})\left[C_{\frac{1}{\overline{\alpha}}\overline{\alpha}}(\overline{\Omega})\right]^{\alpha_1} + b(\overline{\alpha}) \quad (8)$$

Again, the parameter dependent coefficients may be obtained from the limiting conditions for the worst and best candidates $$a(\overline{\alpha}) = \frac{t_2 - t_1}{\prod_1^k [\Omega_i^{max}]^{\alpha_i}}; \quad (9)$$

$$b(\overline{\alpha}) = t_1$$

As in the single criterion case, the multidimensional mapping function $g_{\overline{\alpha}}$ is a decreasing function with respect to each dimension considered individually.

The general mapping function presented above may be applied to the multi-criteria mapping. An exemplary case of a forwarding scheme may obtain a more optimal and efficient tradeoff between link quality and greedy forward progress. An investigative approach may be required because there is no a priori suggestion on what should be the optimal weights of the two criteria. For example, with $\alpha1=\alpha2=1$, the following is obtained (the product of one-hop progress offered by node and the corresponding packet success probability) $C_{(1,1)} = d_x * p_x$, which corresponds to normalized advance (NADV) and maximum expected progress (MEP). However, as described in more detail below, results have shown that this is suboptimal, and a substantially better network performance can be obtained by choosing appropriately the weighting parameters.

Figure 5:
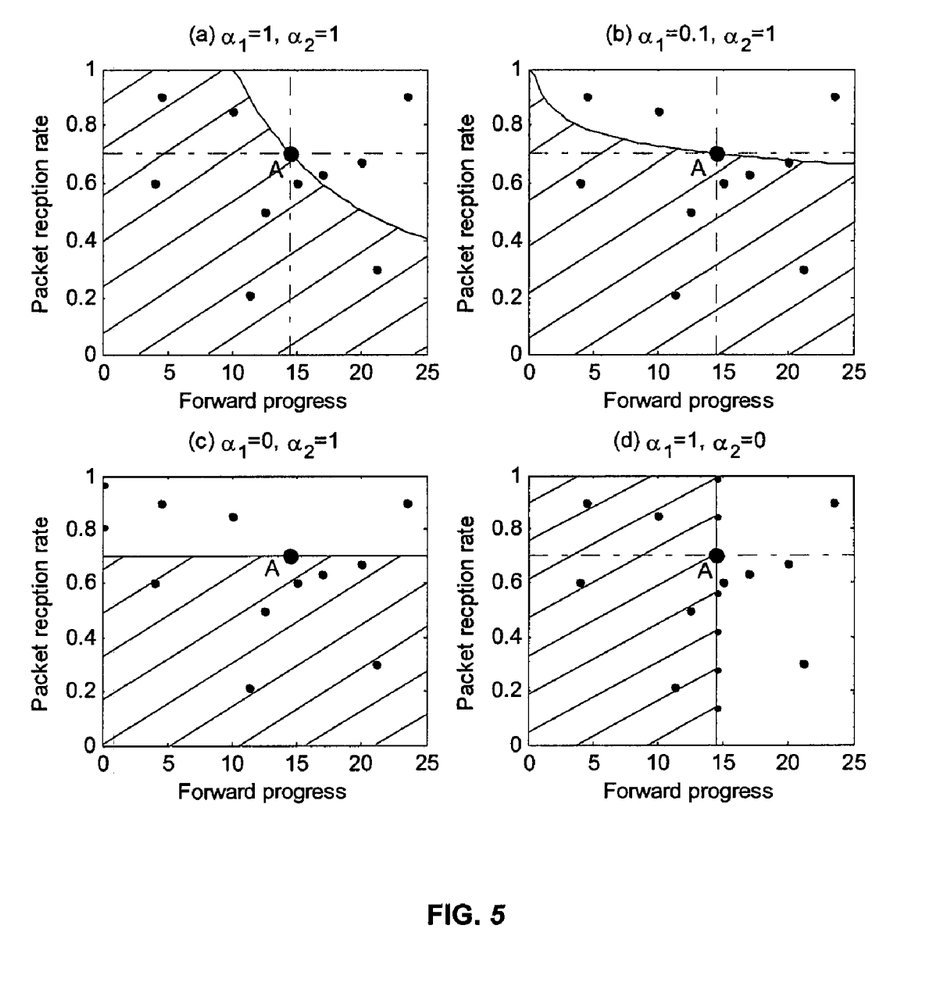
FIG. 5 is a chart illustrating preference with respect to a particular node according to an embodiment.

To see the impact of weight parameters $(\alpha_1)$ on the ranking of alternative relay candidates, consider node A (with $d_A=14.5$ meter, $p_A=0.7$). FIG. 5 shows a chart illustrating preference with respect to a particular node. The set of alternatives is partitioned according to weight given to each criterion. It is notable how in the case of $\alpha1=\alpha2=1$ (FIG. 5(a)) a small increase in forward progress can compensate for a large decrease in link quality. On the other hand, with $\alpha1=0.1$ and $\alpha2=0.1$ (FIG. 5(b)), a node at almost 10 unit distance away from A could offer an almost equally good alternative relay.

It is also notable that, to find the rules for optimal forwarding decision making, only relative values of the two weight parameters are needed. In other words, a ratio of $$\frac{\alpha_1}{\alpha_2} \triangleq \lambda$$

may be desirable because such a ratio optimizes network performance metrics—e.g., energy, packet failure, and delay—both from the perspective of transmitter-side relay selection and receiver-side relay election. The following investigates the optimum value of $\lambda$ via network simulations.

The multi-criteria decision optimization with a two-criteria example of greediness versus link quality is evaluated. In one experimental embodiment, randomly deployed nodes are considered, with varied average density $\rho$(nodes/m2). Nodal parameters are based on Chipcon RFIC CC2420 operating with BFSK modulation scheme at 900 MHz. All nodes transmit with a nominal power (0 dB) and at a rate of 19.2 kbps. Longnormal fading channel with standard deviation of channel disturbance 4 dB and path loss exponent 4.0 have been assumed. Fixed path loss has been calculated considering near field distance 1 meter. Network performance has been studied with approximate end-to-end distance 100 meters. The scheduled reply times range from $t_2=250$ μsec. to $t_1=1$ sec. Fixed packet size has been considered for all transmissions (50 Bytes for DATA and 4 Bytes for RTS). Each message is considered to have 100 data packets. No a priori transmission range has been assumed and all nodes capable of correctly receiving the initial broadcast RTS packet participate in the election process. Also, it has been assumed that a node is aware of its own geographic or virtual (hop-count based) location information and that of the final destination. Each RTS packet contains position information of both the sender and the final destination. To measure the relaying performance with a given tradeoff parameter through an unreliable wireless medium, packet failure rate may be considered along the route. As a baseline comparison, the number of transmissions required for successful delivery of a message at the final destination is recorded.

Figure 6:
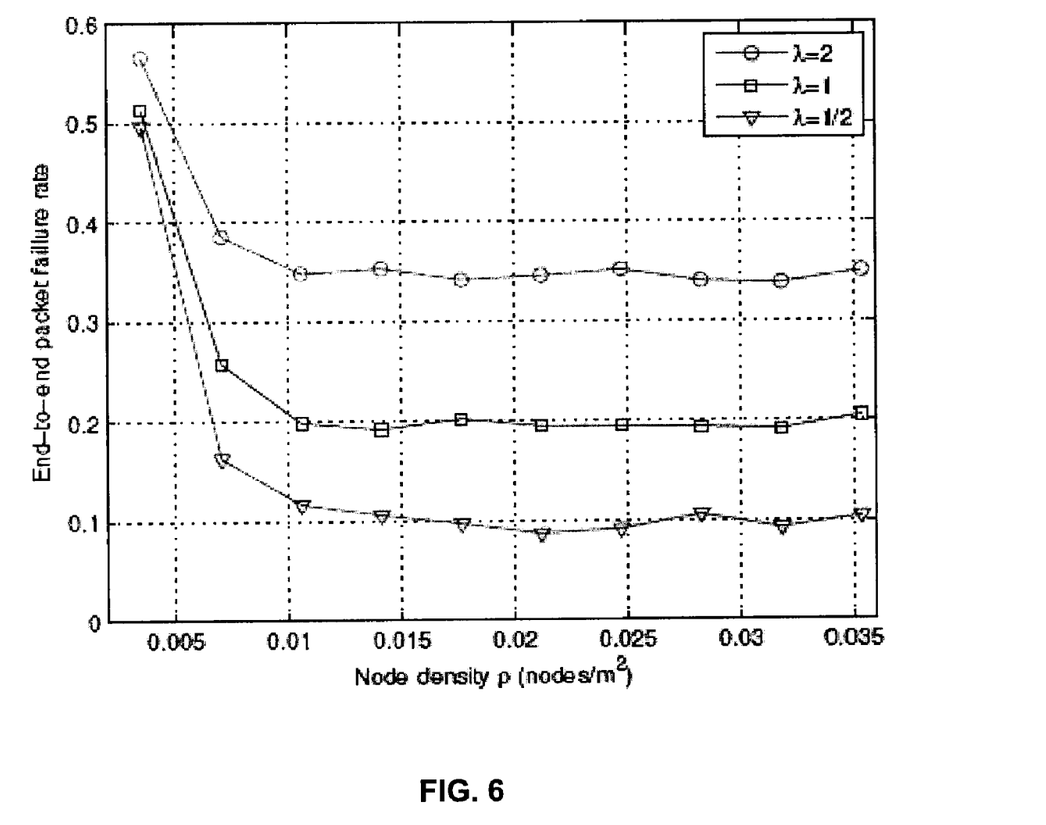
FIG. 6 is a chart illustrating end-to-end packet failure as a function of density according to an embodiment.

FIG. 6 shows a chart illustrating end-to-end packet failure as a function of density. It can be seen from FIG. 6 which is illustrated in terms of the packet loss rate with respect to node density, that beyond certain high node density, irrespective of the tradeoff parameter, the loss performance stabilizes. This is because at very low node density a node tends to find a relay that is associated with a highly error-prone channel. As the density increases, an optimum tradeoff is possible.

Figure 7:
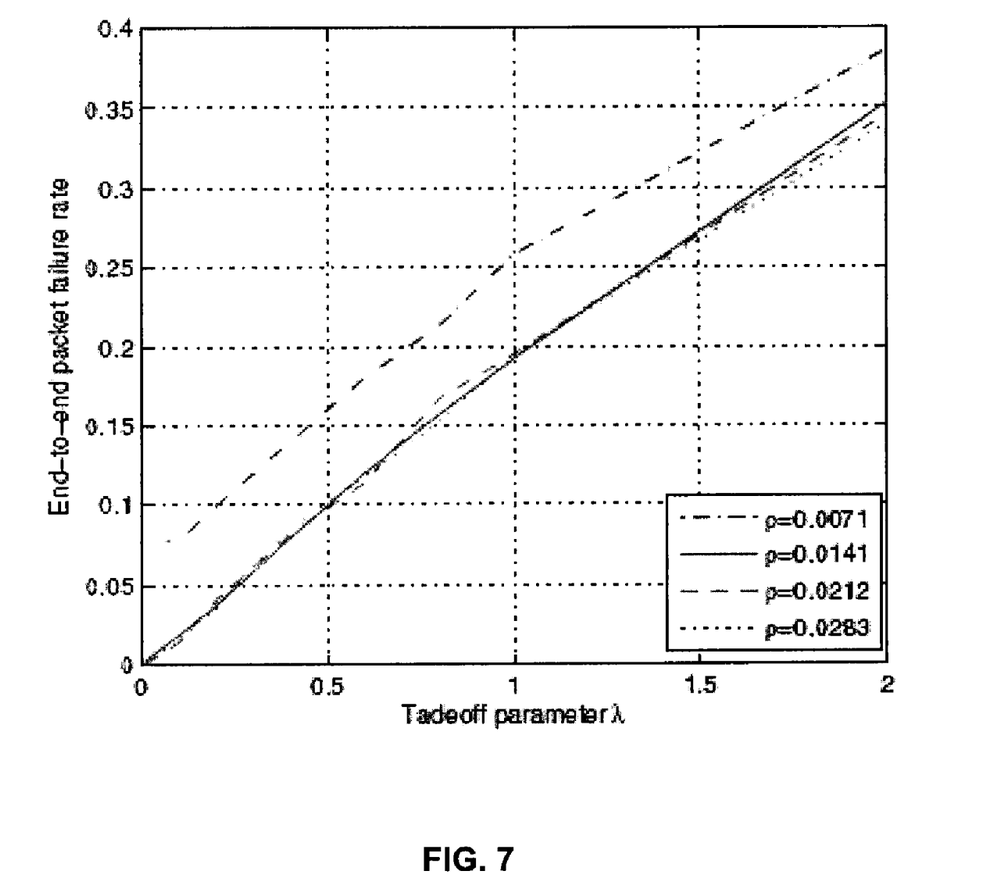
FIG. 7 is a chart illustrating end-to-end packet failure as a function of the tradeoff parameter λ according to an embodiment.

FIG. 7 shows a chart illustrating end-to-end packet failure as a function of the tradeoff parameter $\lambda$. FIG. 7 shows further that packet loss along the entire path can be reduced linearly with the tradeoff parameter $\lambda$. For example, $\lambda=\frac{1}{2}$ reduces the packet failure rate by 50% with respect to simple product of hop progress and packet success rate—i.e., with $\lambda=1$.

End-to-end delay due to packet transmission/retransmission may also be considered. In one simulation, once a relay node is elected, up to max_retx retransmissions are allowed. More than max_retx packet failures result in link error and a new relay election process is initiated. Also each successful transmission takes $t_{tx}$ amount of time and each retransmission causes an additional delay $t_{out}$ due to timeout (negative acknowledgment).

Figure 8:
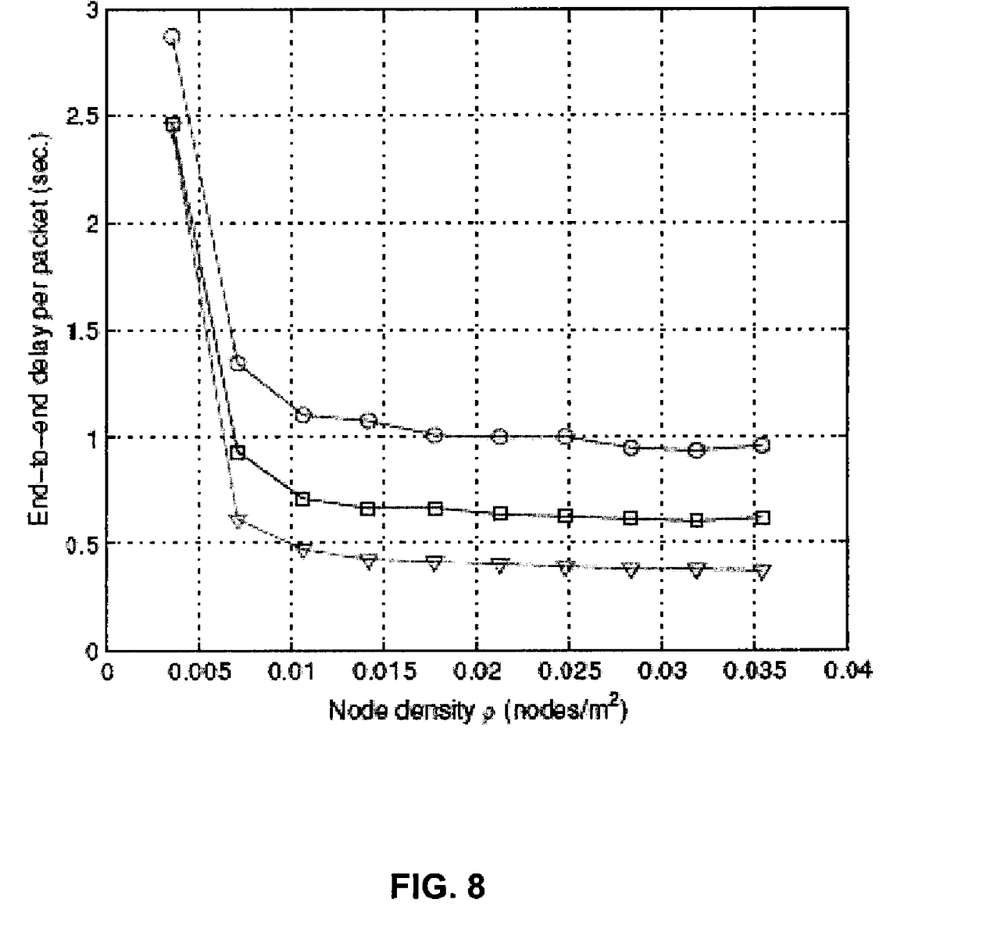
FIG. 8 is a chart illustrating an end-to-end delay as a function of node density according to an embodiment.

FIG. 8 shows a chart illustrating an end-to-end delay as a function of node density. In FIG. 8 mat_retx=8, $t_{tx}$=21.1 msec, and $t_{out}$=84.4 msec. Particularly, FIG. 8 presents end-to-end packet delay as a function of node density which shows the effect of packet failure on packet delay (compare FIG. 8 with FIG. 6). Although FIG. 7 suggests that packet failure and, as a consequence, end-to-end delay can be made arbitrarily small by selecting a smaller tradeoff parameter $\lambda$, the next result on energy efficiency shows that there may exist a minimum value $\lambda$ beyond which an adverse energy effect can be seen.

Figure 9:
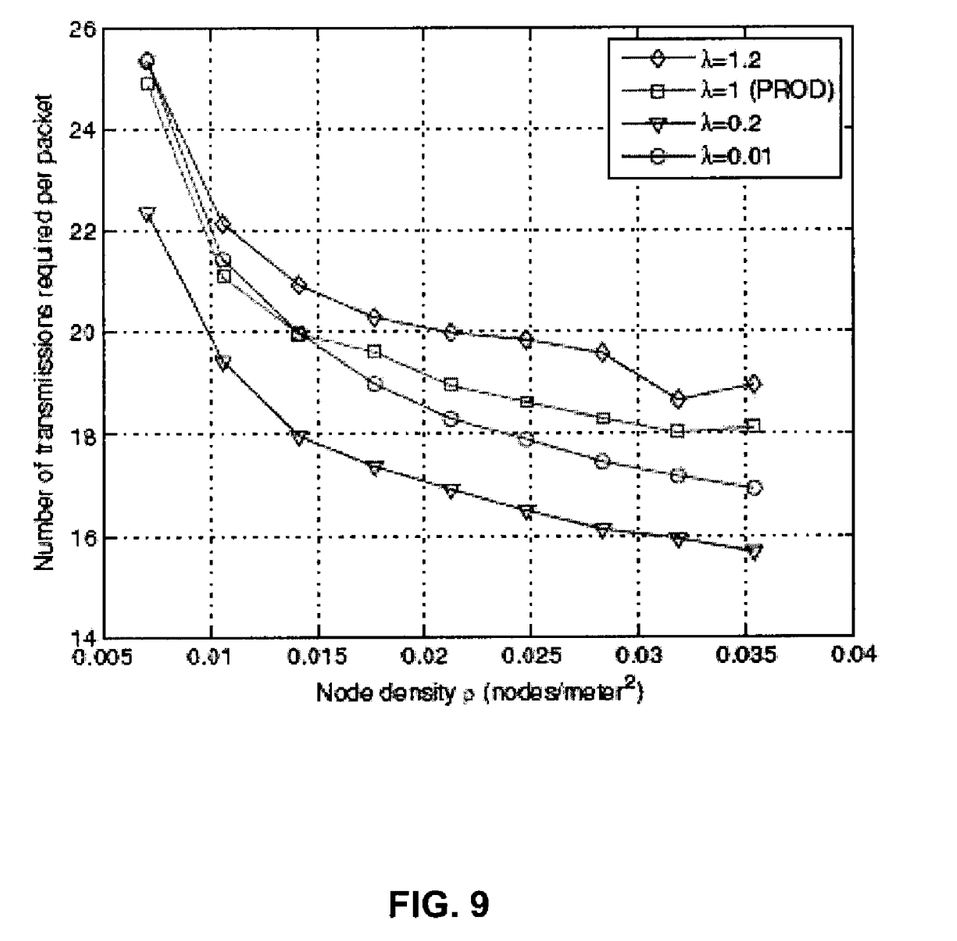
FIG. 9 is a chart illustrating energy consumption for end-to-end packet delivery as a function of node density according to an embodiment.

The energy efficiency of a given forwarding strategy is evaluated by the number of transmissions required along the route for a successful end-to-end packet delivery. As expected, the energy requirement due to forwarding decreases with higher node densities, where it is more likely to find a neighbor offering a good combination of hop progress and link quality. In this regard, FIG. 9 shows a chart illustrating energy consumption for end-to-end packet delivery as a function of node density. FIG. 9 also shows that it is possible to improve energy efficiency by reducing the weight given to hop progress. Clearly $\lambda=0.2$ outperforms the simple product form ($\lambda=1$). It can be seen that further reduction of the weight given to hop progress obtains increased energy consumption.

Figure 10:
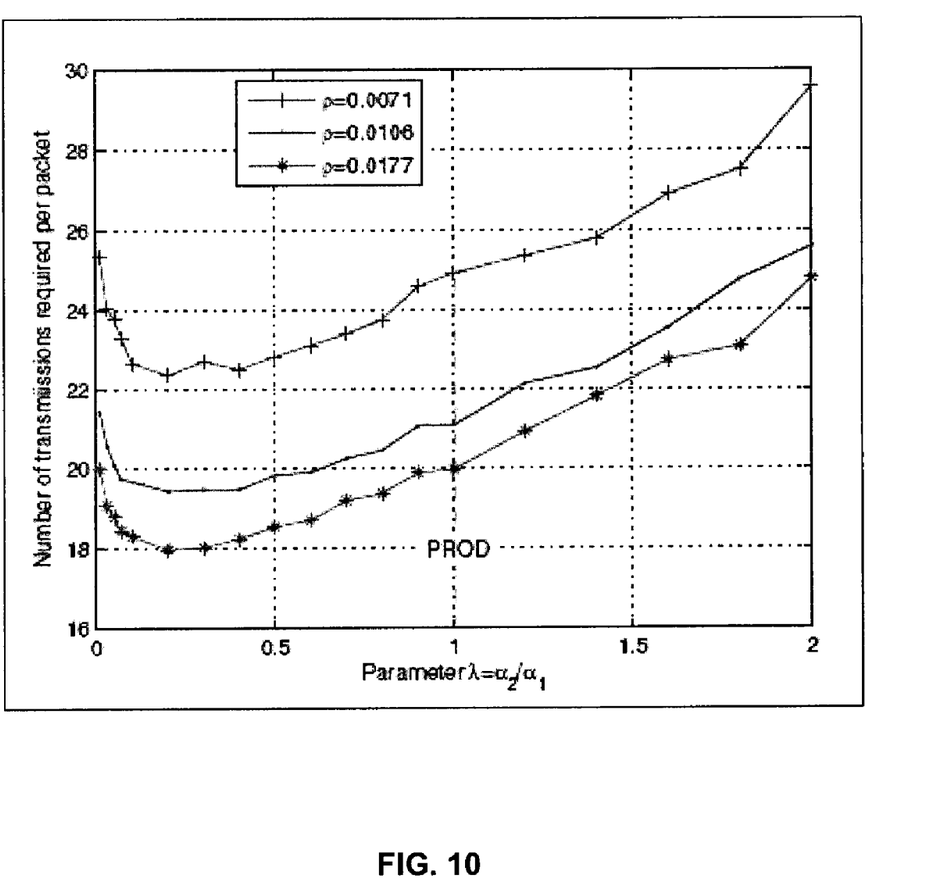
FIG. 10 is a chart illustrating energy consumption (number of required transmissions) as a function of the weightage parameter α according to an embodiment.

FIG. 10 shows a chart illustrating energy consumption (number of required transmissions) as a function of the weightage parameter $\alpha 1$ (with $\alpha 2=1$). It can be seen from FIG. 10 that an optimal tradeoff between hop progress and link quality can be found that minimizes the required energy consumption. It shows that, in at least one embodiment, the optimal performance is achieved approximately at $\alpha=0.2$. Notice from FIG. 7 that this optimal $\lambda$ can achieve up to approximately 5 times reduction in packet failure rate with respect to the simple product form ($\lambda=1$).

Figure 11:
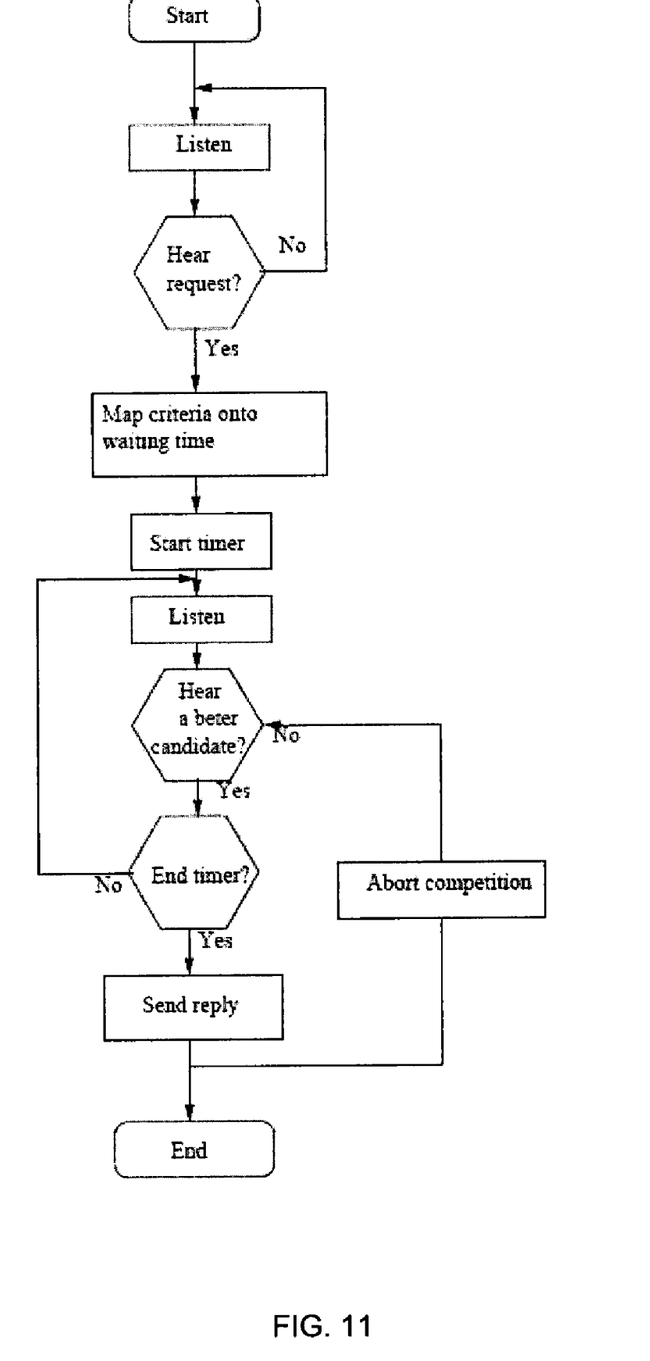
FIG. 11 is a flow chart illustrating one embodiment of a method according to an embodiment.

FIG. 11 shows a flow chart illustrating operations performed in one possible embodiment. Additional, fewer, or different operations may be performed depending on the particular implementation. More particularly, FIG. 11 shows starting a session, listening for a request, and if a request is detected, the criteria is mapped onto the waiting timer. If a request is not detected then the method loops back to listen further.

In this embodiment, once the criteria is mapped onto the waiting time, a timer may be started. Then the method may include listening to hear a better candidate. If one is found, then the timer may be ended. If the timer is not ended, then the listening may be continued. If the timer is ended, then a reply may be sent. If a reply is sent, then the competition may be aborted. Thereafter, the method may end.

A multi-criteria receiver-side relay election framework for multi-hop relaying in ad hoc networks has been provided. First, the importance of finding optimum weighted relay election/selection criteria was shown. A generalized cost metric in the form of multi-parameter mapping function is proposed and used to investigate optimal tradeoff between greedy forwarding and link quality. It has been shown that a much better network performance in terms of total energy consumption for successful end-to-end routing can be achieved via judicious selection of the weighting parameter that optimally trades off between greediness and link quality. The multi-criteria mapping function is quite general and can also be applicable to transmitter-side relay selection process.

Thus, a multi-criteria optimization for relaying in multi-hop wireless ad hoc and sensor networks has been provided. Persons skilled in the art will appreciate that the technology described in the present application can be practiced by other than the described embodiments, which are presented for purposes of illustration rather than of limitation, and the present invention is limited only by the claims which follow.

We claim:

1. A method for relaying in multi-criteria receiver-side relay election wireless networks, said method comprising:
   obtaining, at a node, a first criterion for analyzing receiver-side relay election;
   obtaining, at the node, a second criterion for analyzing receiver-side relay election;
   determining a tradeoff parameter;
   weighting the first criterion with a first weighting parameter and the second criterion with a second weighting parameter, wherein a ratio of the first weighting parameter to the second weighting parameter comprises the tradeoff parameter;
   aggregating the weighted first criterion and the weighted second criterion using an aggregation formula to obtain a single virtual criterion; and
   ranking candidate relay nodes based on the single virtual criterion.

2. The method of claim 1, wherein the first criterion is one-hop progress.

3. The method of claim 1, wherein the first criterion is packet success rate.

4. The method of claim 1, wherein the second criterion is one-hop progress.

5. The method of claim 1, wherein the second criterion is packet success rate.

6. A method for optimizing a transmission of a wireless packet in a wireless network, said method comprising:
   using a mapping function to determine, with a processor of a transmission optimization system, a shape parameter that can be used to minimize the duration of an election between nodes in the wireless network and to reduce the probability of collision between contending potential relays;
   optimizing, with the processor of the transmission optimization system, the shape parameter to minimize the duration of an election between nodes in the wireless network and to reduce the probability of collision between contending potential relays; and
   resolving, with the processor of the transmission optimization system, contention among contending potential relays to elect a most suitable candidate as a next hop relay, wherein resolving contention among contending potential relays comprises determining a response time delay, $X_i$, based on:

$$X_i = g_\alpha(d_i) = a(\alpha)d_i^\alpha + b(\alpha)$$

where $\alpha$ is the shape parameter and $d_i$ is forward progress.

7. The method of claim 6, wherein resolving contention among contending potential relays also comprises resolving by a distance dependent time back off procedure.

8. The method of claim 6, wherein resolving contention among contending potential relays also comprises resolving by a random time back off procedure.

9. The method of claim 6, further comprising optimizing the shape parameter for a single criterion approach to relaying packets in a wireless network.

10. The method of claim 6, further comprising optimizing the shape parameter for a multi-criteria approach to relaying packets in a wireless network.

11. A system for multi-criteria receiver-side relay elections in wireless networks, the system comprising:
a processor configured to:
determine a tradeoff parameter;
weight a first criterion with a first weighting parameter and a second criterion with a second weighting parameter, wherein a ratio of the first weighting parameter to the second weighting parameter comprises the tradeoff parameter;
aggregate the first weighted criterion and the second weighted criterion using an aggregation formula;
obtain a single virtual criterion with the aggregation formula; and
rank candidate relay nodes based on the single virtual criterion.

12. The system of claim 11, wherein the first criterion is one-hop progress and the second criterion is packet success rate.

13. The system of claim 11, wherein the processor is further configured to elect a next hop relay node based on the rank of the candidate relay node.

14. A system that optimizes a transmission of a wireless packet in a wireless network, the system comprising:
a processor configured to:
determine a shape parameter for minimizing duration of an election between nodes in the wireless network and reducing probability of collision between potential relays;
optimize the shape parameter to minimize duration of an election between nodes in the wireless network and to reduce probability of collision between contending potential relays; and
resolve contention among contending potential relays to elect a most suitable candidate as a next hop relay, wherein resolving contention among contending potential relays comprises determining a response time delay, $X_i$, based on:

$$X_i = g_\alpha(d_i) = a(\alpha)d_i^\alpha b + b(\alpha)$$

where $\alpha$ is the shape parameter and $d_i$ is forward progress.

15. The system of claim 14, wherein the processor is further configured to optimize the shape parameter for a single criterion approach to relaying packets.

16. The system of claim 14, wherein the processor is further configured to optimize the shape parameter for a multi-criteria approach to relaying packets.

17. The system of claim 14, wherein the processor is further configured to resolve contention among the contending potential relays by using a distance dependent time back off procedure.

18. The system of claim 14, wherein the processor is further configured to resolve contention among the contending potential relays by using a random time back off procedure.

* * * * *

UNITED STATES PATENT AND TRADEMARK OFFICE
CERTIFICATE OF CORRECTION

| | |
|---|---|
| PATENT NO. | : 7,872,977 B2 |
| APPLICATION NO. | : 12/132860 |
| DATED | : January 18, 2011 |
| INVENTOR(S) | : De et al. |

It is certified that error appears in the above-identified patent and that said Letters Patent is hereby corrected as shown below:

Title Page 2, item (56), under "Other Publications", in Column 2, Line 16, after "Patent" delete "of".

Signed and Sealed this
Thirty-first Day of May, 2011

David J. Kappos
*Director of the United States Patent and Trademark Office*